(12) United States Patent
Strasser et al.

(10) Patent No.: US 11,516,965 B2
(45) Date of Patent: Dec. 6, 2022

(54) ELECTRICALLY ACTUATED MULCH CONTROL LEVER

(71) Applicant: DEERE & COMPANY, Moline, IL (US)

(72) Inventors: Ryan S Strasser, Juneau, WI (US); Christopher Warren, Beaver Dam, WI (US)

(73) Assignee: DEERE & COMPANY, Moline, IL (US)

( * ) Notice: Subject to any disclaimer, the term of this patent is extended or adjusted under 35 U.S.C. 154(b) by 610 days.

(21) Appl. No.: 16/582,687

(22) Filed: Sep. 25, 2019

(65) Prior Publication Data

US 2021/0084819 A1    Mar. 25, 2021

(51) Int. Cl.
| | | |
|---|---|---|
| *A01D 42/00* | (2006.01) | |
| *A01D 34/00* | (2006.01) | |
| *F16H 21/44* | (2006.01) | |
| *A01D 34/71* | (2006.01) | |
| *A01D 101/00* | (2006.01) | |

(52) U.S. Cl.
CPC ......... *A01D 42/005* (2013.01); *A01D 34/005* (2013.01); *A01D 34/008* (2013.01); *A01D 34/71* (2013.01); *F16H 21/44* (2013.01); *A01D 2101/00* (2013.01)

(58) Field of Classification Search
CPC ............... A01D 42/005; A01D 34/008; A01D 2101/00; F16H 21/44
USPC ...................................................... 56/320.2
See application file for complete search history.

(56) References Cited

U.S. PATENT DOCUMENTS

| | | | |
|---|---|---|---|
| 4,072,332 A | 2/1978 | Isaia | |
| 5,205,112 A | 4/1993 | Tillotson et al. | |
| 6,609,358 B1 | 8/2003 | Schmidt et al. | |
| 6,971,224 B1 * | 12/2005 | Hancock | A01D 34/71 |
| | | | 56/255 |
| 7,174,700 B2 | 2/2007 | Chenevert et al. | |
| 7,448,195 B2 | 11/2008 | Kohler | |
| 7,594,379 B2 * | 9/2009 | Nicholson | A01D 34/71 |
| | | | 56/320.2 |
| 9,485,911 B2 | 11/2016 | Thorman et al. | |
| 9,699,963 B2 | 7/2017 | Ressler et al. | |
| 9,750,179 B2 | 9/2017 | Korthals et al. | |
| 2004/0112031 A1 * | 6/2004 | Dickey | A01D 42/005 |
| | | | 56/320.2 |
| 2008/0000211 A1 * | 1/2008 | Hafendorfer | A01D 34/82 |
| | | | 56/320.2 |

OTHER PUBLICATIONS

Lever-action or electric one-touch MulchControl, Deere Sales Manual, retrieved from internet<http://salesmanual.deere.com/sales/salesmanual/en_NA/lawn_equipment/2018/feature/mower_decks_mulching/mulchcontrol_lever_or_electric.html> dated Aug. 26, 2019.

* cited by examiner

*Primary Examiner* — Mahmoud Gimie

(57) ABSTRACT

An electrically actuated mulch control lever includes an upper plate and a lower plate pivotably mounted together on a top surface of a mower deck. A compression spring is retained between the upper plate and the lower plate urging the upper plate and the lower plate to pivot together. An electric linear actuator is connected to one of the plates, and a mulch gate hinge is attached to the other plate.

10 Claims, 4 Drawing Sheets

ELECTRICALLY ACTUATED MULCH CONTROL LEVER

FIELD OF THE INVENTION

This invention relates to mower decks and, more specifically, multi-blade mower decks that may be converted between side discharge and mulching positions.

BACKGROUND OF THE INVENTION

Multi-blade mower decks have been offered with hinged baffles or gates that may be pivoted between side discharge and mulching positions. For example, U.S. Pat. No. 6,609,358 for "Mower Having a Mower Deck Adapted for Selective Mulching or Non-Mulching Modes" assigned to Deere & Company relates to a multi-blade mower deck with hinged baffles or gates that may pivot from side discharge to mulching positions. The hinged baffles or gates may be connected to a mulch control lever above the deck. A mulch control lever includes an upright handle an operator may use for shifting the hinged baffles or gates between side discharge and mulching positions.

U.S. Pat. No. 9,485,911, also assigned to Deere & Company, relates to a mulch control lever on the mower deck with an over center tension spring that biases the lever to the side discharge or mulching positions. U.S. Pat. No. 9,699,963 assigned to Deere & Company relates to a detent plate on the mower deck that stops the mulch control lever in the side discharge and mulching positions.

U.S. Pat. No. 9,750,179 assigned to Deere & Company relates to an electric linear actuator with a plunger or ram that actuates a mulch control lever to move one or more hinged baffles or gates between side discharge and mulching positions. The electric linear actuator is connected to a switch that may be activated from the mower operator station. A spring or limiting switch may compensate for over or under travel of the plunger or ram of the electric linear actuator.

There is a need for an electrically actuated mulch control lever that is inexpensive and easy for an operator to install with a mulch kit. There is a need for an electrically actuated mulch control lever that compensates for over or under travel of the plunger or ram of an electric linear actuator.

SUMMARY OF THE INVENTION

An electrically actuated mulch control lever includes a first plate pivotably mounted on a first vertical pivot axis, and a second plate pivotably mounted on the first vertical pivot axis under the first plate and also attached to a mulch gate hinge. A matching slot is provided through each of the first and second plates, and a compression spring is retained in the matching slots to urge the first and second plate to pivot together to pivot a mulch gate on the mulch gate hinge between a side discharge position and a mulching position. The electrically actuated mulch control lever is inexpensive, easy for an operator to install with a mulch kit, and compensates for over or under travel of the plunger or ram of an electric linear actuator.

DESCRIPTION OF THE PREFERRED EMBODIMENT

Figure 1:
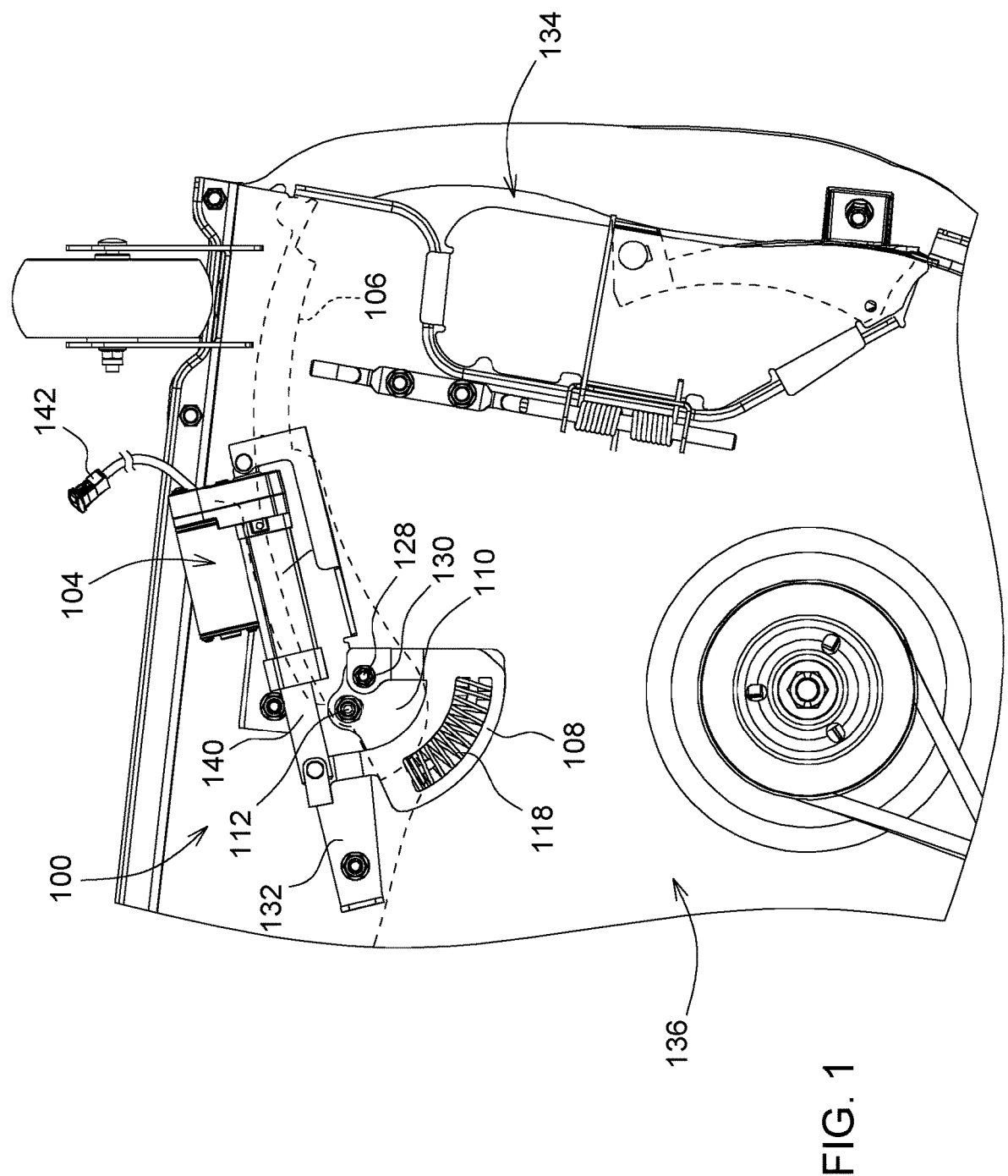
FIG. 1 is a top perspective view of an electrically actuated mulch control lever showing an extended plunger or ram of an electric linear actuator, and the mulch gate in a side discharge position, according to a first embodiment of the invention.
Figure 2:
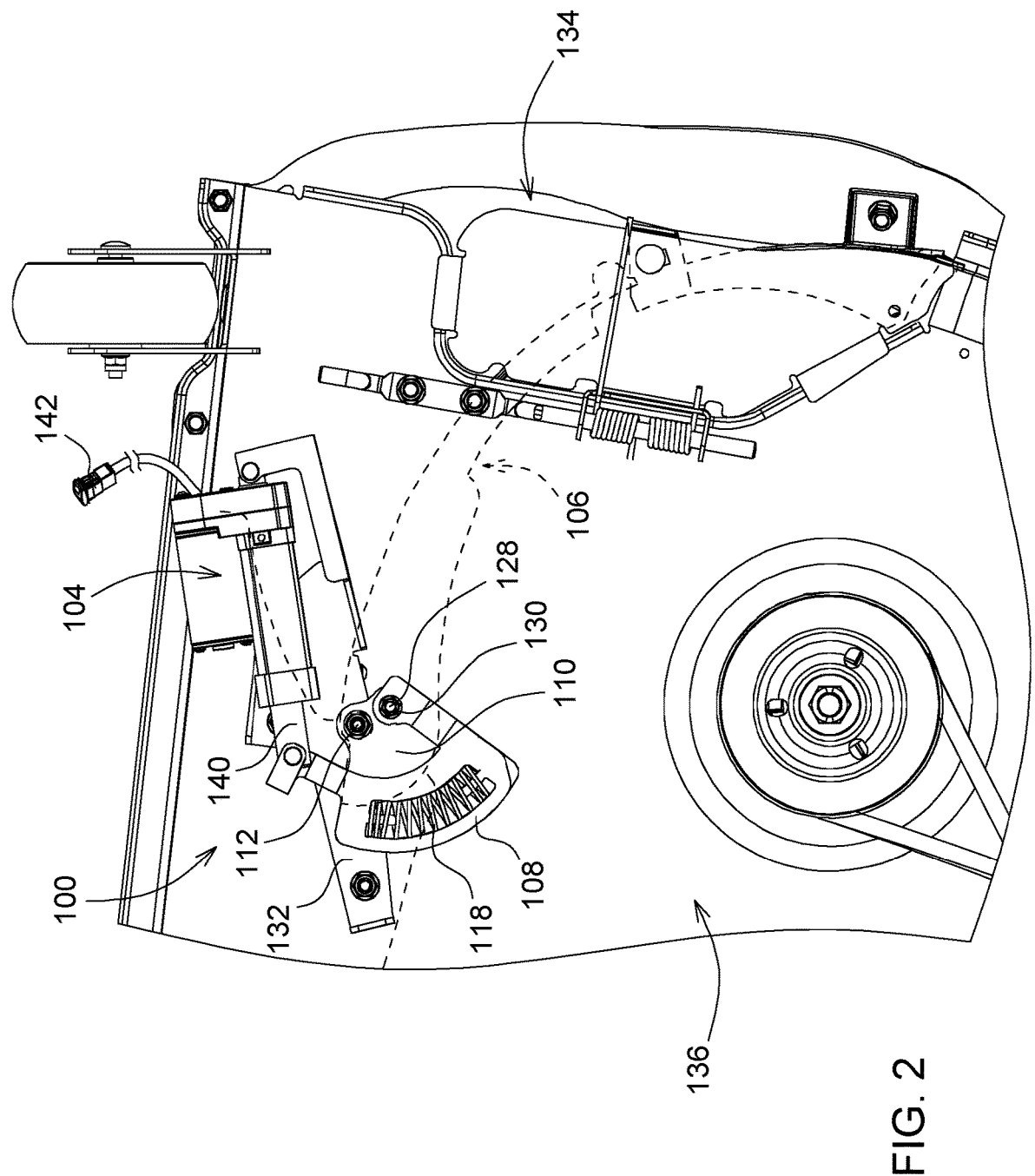
FIG. 2 is a top perspective view of an electrically actuated mulch control lever showing a retracted plunger or ram of an electric linear actuator, and the mulch gate in a mulching position, according to a first embodiment of the invention.

In a first embodiment, electrically actuated mulch control lever 100 may be used to pivot one or more mulch gates or baffles 106 between a side discharge position shown in FIG. 1, and a mulching position shown in FIG. 2. The mulch control lever may be used with electric linear actuator 104 having plunger or ram 140 that moves from a retracted position to an extended position in response to the operator's activation of mulch control switch 142 in the operator station of a lawn tractor, zero turn mower or other grass mowing vehicle. The switch may be connected by wiring harness 144 to the electric linear actuator.

In one embodiment, electrically actuated mulch control lever 100 may include first and second sheet metal plates 108, 110, compression spring 118, and plate pivot bushing 114. The electrically actuated mulch control lever components may be assembled together before the mulch control lever is installed on the top surface of a mower deck. More specifically, the compression spring may be positioned between the first and second plates before the plates are pivotably mounted on the mower deck. For example, the compression spring may be positioned in matching curved slots 120, 122 in the first and second plates. Spring retainers 124, 126 may extend inwardly from the ends of each curved slot into the ends of the compression spring to hold the spring in place. The first and second plates may be placed on top of each other, and the curved slots in each plate may match each other, having substantially the same shape and dimensions. Plate pivot bushing 114 may be inserted through corresponding holes in each plate, to provide a vertically oriented pivot axis defined by pivot bolt 128. The plate pivot bushing then may be secured with pivot nut 130.

In one embodiment, electrically actuated mulch gate lever 100 may be used to pivot mulch gate or baffle 106 mounted to mulch gate hinge 112. The mulch gate hinge may extend vertically through the mower deck adjacent or on the same vertical axis of plate pivot bushing 114. The mulch gate hinge also may extend through support bracket 132 which may support the mulch gate lever and the electric linear actuator adjacent side discharge opening 134 in mower deck 136. The mulch gate hinge may have a cross section that engages mulch gate hinge opening 138 in the second or lower plate 110.

In one embodiment, as shown in FIG. 1, plunger or ram 140 of electric linear actuator 104 may be extended. The plunger or ram may be pivotably connected to actuator mount 146 on first plate 108. The plunger or ram may force the first plate to pivot on the vertical axis of plate pivot bolt 128. Compression spring 118 may urge second plate 110 to pivot together with the first plate. The second plate may be independently mounted on the same vertical axis of the plate pivot bolt, and also may be attached to the vertical axis of the mulch gate hinge. The mulch gate pivot axis may be within about 1 inch from the plate pivot bolt axis or may be on the same axis. As a result, the second plate may pivot mulch gate 106 to the side discharge position. In FIG. 2, the plunger or ram is retracted, forcing the first plate to pivot on the vertical axis of the plate pivot bolt. Compression spring may urge the second plate to pivot on the plate pivot bolt axis with the first plate, and the second plate also may pivot mulch gate 106 to the mulch position.

Figure 3:
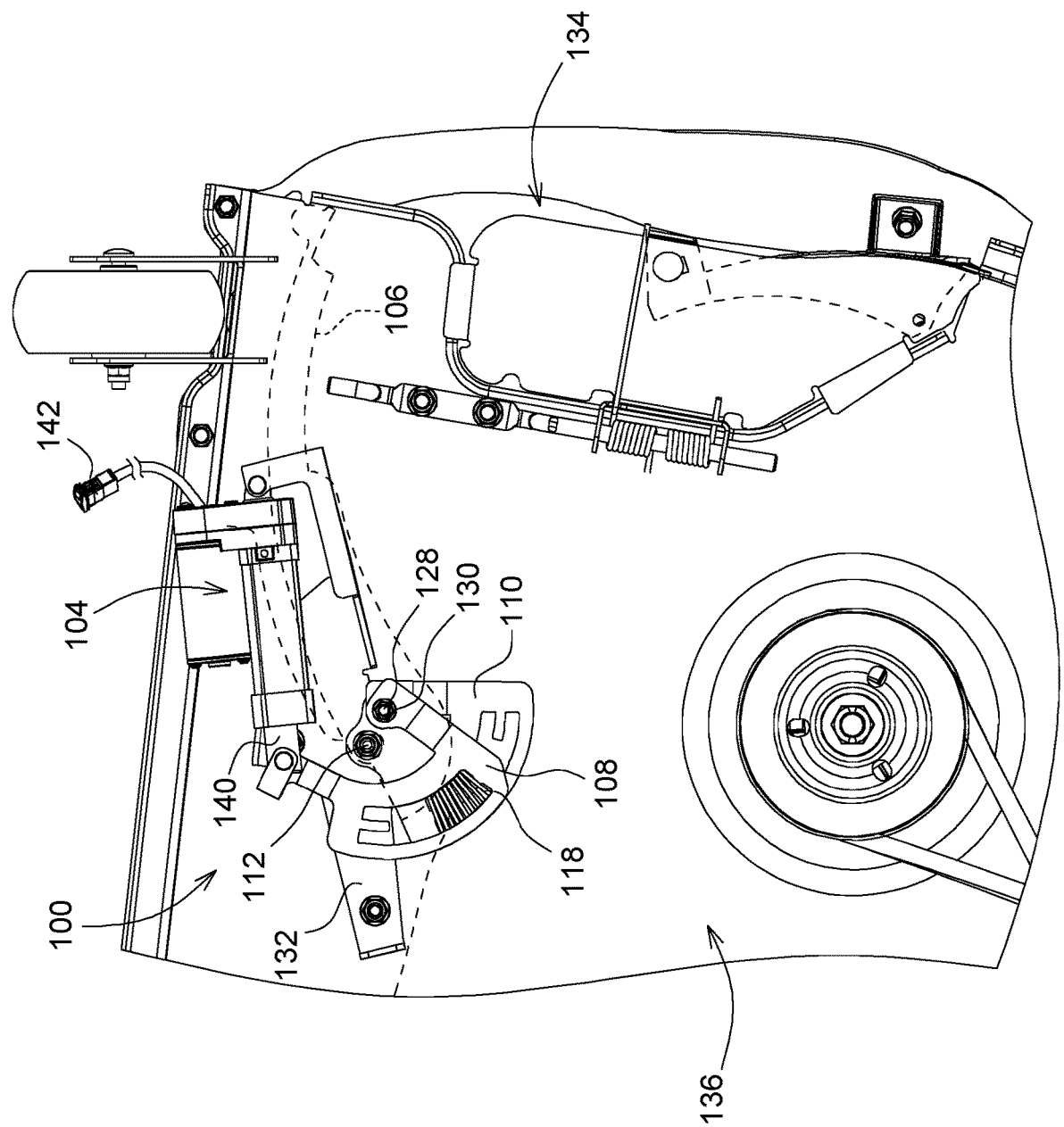
FIG. 3 is a top perspective view of an electrically actuated mulch control lever showing a retracted plunger or ram of an electric linear actuator, and the mulch gate in a side discharge position, according to a first embodiment of the invention.
Figure 4:
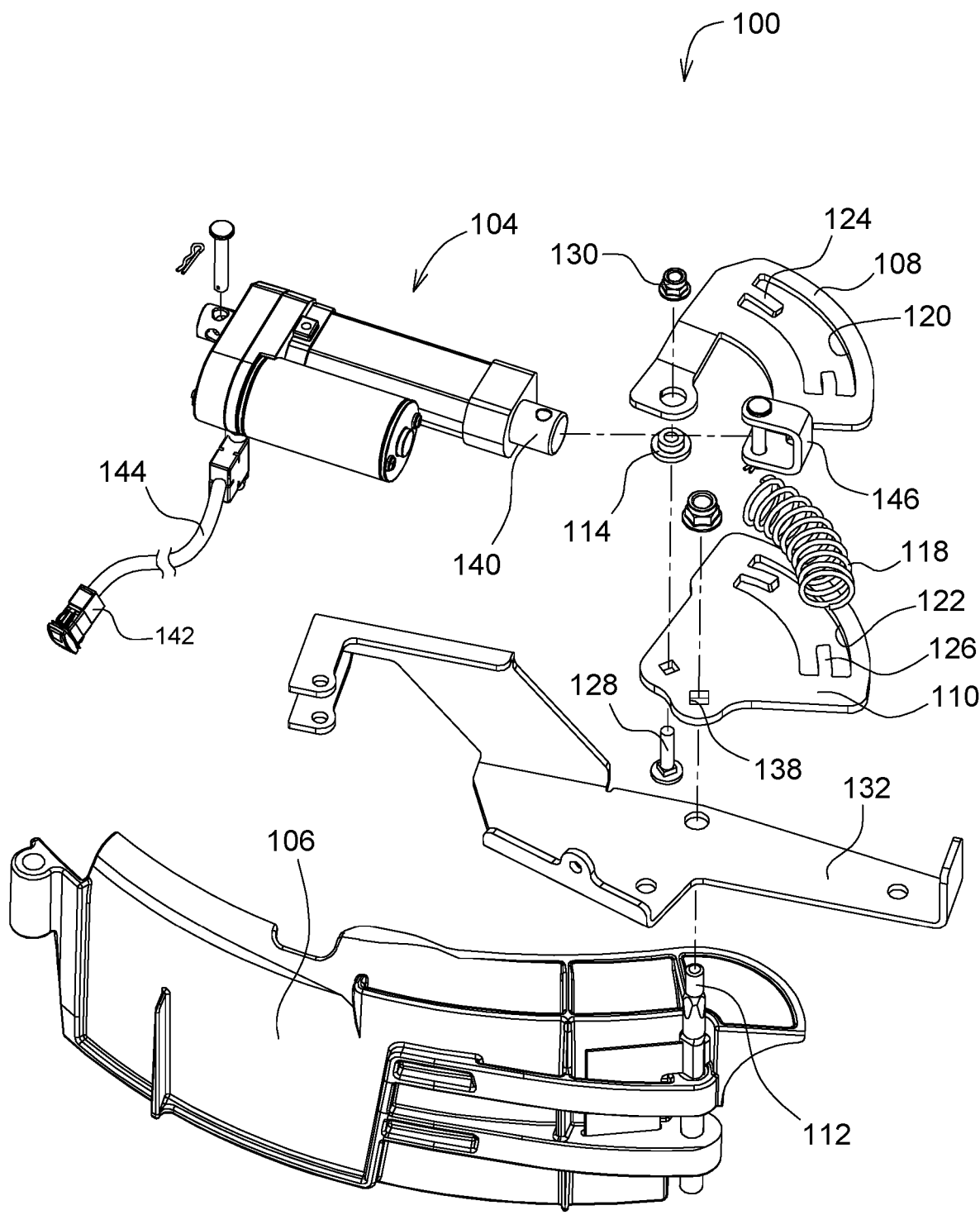
FIG. 4 is an exploded perspective view of an electrically actuated mulch control lever according to a first embodiment of the invention.

In one embodiment, electrically actuated mulch control lever 100 may compensate for over or under travel of the plunger or ram 140 of electric linear actuator 104. Over or under travel may be due to component wear, malfunction, or obstructions preventing mulch gate 106 from pivoting. For example, FIG. 3 shows the plunger or ram is retracted, and the mulch gate is blocked or stuck in the side discharge position. When this occurs, compression spring 118 may be compressed in the matching curved slots between the first and second plates. Similarly, the compression spring may be compressed in the curved slots if the plunger or ram is extended, but the mulch gate is blocked or stuck in the mulching position.

Having described the preferred embodiment, it will become apparent that various modifications can be made without departing from the scope of the invention as defined in the accompanying claims.

The invention claimed is:

1. An electrically actuated mulch control lever, comprising:
   a first plate pivotably mounted on a first vertical pivot axis;
   a second plate pivotably mounted on the first vertical pivot axis under the first plate and also attached to a mulch gate hinge;
   a matching slot in each of the first and second plates; and
   a compression spring retained in the matching slots to urge the first and second plate to pivot together to pivot a mulch gate on the mulch gate hinge between a side discharge position and a mulching position;
   an actuator mount pivotably connecting the first plate to a plunger of an electric linear actuator.

2. The electrically actuated mulch control lever of claim 1 wherein the slot in each plate is curved.

3. The electrically actuated mulch control lever of claim 1 wherein the mulch gate hinge has a vertical axis within one inch of the first vertical pivot axis.

4. The electrically actuated mulch control lever of claim 1 further comprising a spring retainer extending inwardly from an end of each of the slots.

5. An electrically actuated mulch control lever, comprising:
   a first plate mounted on top of a second plate; each plate having a matching curved slot;
   a plate pivot bushing inserted through a corresponding hole in each plate and providing a vertically oriented pivot axis;
   a compression spring held in the matching curved slots urging the first and second plates to pivot together on the pivot axis to move a gate between a side discharge position and a mulching position; and
   an electric linear actuator pivotably connected to the first plate.

6. The electrically actuated mulch control lever of claim 5 wherein the second plate is attached to a mulch gate hinge adjacent the pivot axis.

7. The electrically actuated mulch control lever of claim 5 wherein the electric linear actuator includes an extendable plunger.

8. An electrically actuated mulch control lever, comprising:
   an upper plate and a lower plate pivotably mounted together on a top surface of a mower deck with a compression spring retained between the upper plate and the lower plate urging the upper plate and the lower plate to pivot together;
   an electric linear actuator connected to one of the upper plate and the lower plate; and
   a mulch gate hinge attached to the other of the upper plate and the lower plate.

9. The electrically actuated mulch control lever of claim 8, further comprising a matching curved slot in each of the upper plate and the lower plate where the compression spring is retained.

10. The electrically actuated mulch control lever of claim 8 wherein the mulch gate hinge is on a vertical axis adjacent a side discharge opening of a mower deck.

* * * * *